(12) United States Patent
Koizumi et al.

(10) Patent No.: US 6,197,865 B1
(45) Date of Patent: Mar. 6, 2001

(54) PROCESS FOR PRODUCING AQUEOUS EMULSION

(75) Inventors: Tatsuya Koizumi, Futtsu; Tatsuo Mitsutake, Ichihara, both of (JP)

(73) Assignee: Sumitomo Chemical Company, Limited, Osaka (JP)

( * ) Notice: Subject to any disclaimer, the term of this patent is extended or adjusted under 35 U.S.C. 154(b) by 0 days.

(21) Appl. No.: 09/108,313

(22) Filed: Jul. 1, 1998

(30) Foreign Application Priority Data

Jul. 3, 1997 (JP) .................................................... 9-178238

(51) Int. Cl.⁷ ................................ C08F 2/24; C08L 29/04

(52) U.S. Cl. ........................................... 524/459; 524/803

(58) Field of Search ...................................... 524/459, 803

(56) References Cited

U.S. PATENT DOCUMENTS

| | | |
|---|---|---|
| 4,128,518 | 12/1978 | Oyamada et al. . |
| 5,070,134 | 12/1991 | Oyamada et al. .................... 524/503 |
| 5,110,856 | 5/1992 | Oyamada et al. .................... 524/459 |
| 5,629,370 | 5/1997 | Freidzon . |

FOREIGN PATENT DOCUMENTS

| | | |
|---|---|---|
| 279384 | 8/1988 | (EP) . |
| 2021548A | 7/1970 | (FR) . |
| 6100751 | 4/1994 | (JP) . |

*Primary Examiner*—Tae Yoon
(74) *Attorney, Agent, or Firm*—Birch, Stewart, Kolasch & Birch, LLP

(57) ABSTRACT

A process for producing an aqueous emulsion having a solid content of 70% by weight or more, a viscosity of 5,000 mPa.s or less and containing an ethylene-vinyl acetate copolymer having 10–40% by weight of ethylene unit and 90–60% of by weight of vinyl acetate unit.

3 Claims, No Drawings

PROCESS FOR PRODUCING AQUEOUS EMULSION

BACKGROUND OF THE INVENTION

1. Field of the Invention

The present invention relates to a process for producing an aqueous emulsion. More precisely, the present invention relates to a process for producing an aqueous emulsion, said process allowing to produce an aqueous ethylene-vinyl acetate copolymer emulsion having an extremely high solid concentration, and said process enabling suppression of increase in viscosity of the reaction system during copolymerization reaction and formation of a stable emulsion.

2. Prior Art

Aqueous ethylene-vinyl acetate copolymer emulsions have found wide applications in the field of adhesive. From the viewpoint of drying efficacy, it is required that aqueous emulsions for adhesive have a high solid concentration. When aqueous ethylene-vinyl acetate copolymer emulsions with high solid content were produced according to conventional processes, however, there was a problem that the viscosity in the reaction system increased during copolymerization reaction, resulting in difficulty in stable completion of the desired copolymerization reaction due to insufficient stirring or insufficient removal of heat of reaction.

The present inventors have extensively studied for a process for producing an aqueous ethylene-vinyl acetate copolymer emulsion having no such problems, and found that an aqueous emulsion having a high solid cotent can be stably produced by adding vinyl acetate and a polyvinyl alcohol as an emulsifying dispersant to the copolymerization system in divided portions so that the increase in viscosity is suppressed. The present invention has been completed

SUMMARY OF THE INVENTION

Accordingly, the present invention provides a process for producing an aqueous emulsion having a solid content of 70% by weight or more, a viscosity of 5,000 mpa.s or less and containing an ethylene-vinyl acetate copolymer having 10–40% by weight of ethylene unit and 90–60% of by weight of vinyl acetate unit, wherein said process satisfies the following conditions:

(1) 50–90% of vinyl acetate is placed in the copolymerization reaction system before the reaction and the remaining 50–10% of vinyl acetate is supplied to the reaction system after the initiation of the copolymerization reaction;

(2) An emulsifying dispersant is used in 2–6 parts by weight per 100 parts by weight of vinyl acetate. Said emulsifying dispersant comprises a polyvinyl alcohol having a degree of hydrolysis of 80% by mole or more and an average degree of polymerization of 200–1,000% and a polyoxyethylene nonionic surfactant having a HLB of 10–20;

(3) The amount of the polyvinyl alcohol to be used as above is 0.4–3 parts by weight per 100 parts by weight of vinyl acetate. 10–50% of said polyvinyl alcohol is placed in the copolymerization reaction system before the reaction and the remaining 50–90% is supplied to the reaction system after the initiation of the copolymerization reaction; and (4) The amount of said polyoxyethylene nonionic surfactant to be used is 1–5 parts by weight per 100 parts by weight of vinyl acetate. The total amount of said polyoxyethylene nonionic surfactant is placed in the copolymerization reaction system before the reaction.

DETAILED DESCRIPTION OF THE INVENTION

The process of the present invention is required to satisfy the whole of the above-described conditions. According to the condition described under (1), it is required that 50–90% of the total amount of vinyl acetate subjected to copolymerization reaction is placed in the copolymerization reaction system before the reaction and the remaining 50–10% of the total amount of vinyl acetate subjected to copolymerization reaction is supplied to the reaction system after the initiation of the copolymerization reaction. In the present invention, the portion placed in the copolymerization reaction system before the reaction may be referred to as "initial charge" and the portion supplied to the reaction system after the initiation of the copolymerization reaction may be referred to as "subsequent addition". Further, in the present invention, the expression 'after the initiation of the copolymerization reaction' means 'after a polymerization catalyst is added to the reaction system and the temperature in the reaction system begins to rise'. If the amount of initial charge of vinyl acetate is too little or too much, the viscosity of emulsion increases. In the present invention, the manner of subsequent addition includes continuous addition and intermittent addition. The addition time is usually 2–4 hours.

According to the condition described under (2), it is required that an emulsifying dispersant is used in 2–6 parts by weight per 100 parts by weight of the total amount of vinyl acetate subjected to copolymerization reaction. Said emulsifying dispersant comprises a polyvinyl alcohol having a degree of hydrolysis of 80% by mole or more and an average degree of polymerization of 200–1,000, preferably 250–800, and a polyoxyethylene nonionic surfactant having a HLB of 10–20. If the amount of the emulsifying dispersant is too little, the emulsion contains much amount of sediment. On the contrary, if the amount of the emulsifying dispersant is too much, the viscosity of the emulsion increases. If the degree of hydrolysis of the polyvinyl alcohol is too low, the emulsion contains much amount of sediment. If the average degree of polymerization of the polyvinyl alcohol is too low, the emulsion contains much amount of sediment. On the contrary, if the average degree of polymerization is too high, the viscosity of the emulsion increases. If the HLB of the polyoxyethylene nonionic surfactant is too low, the emulsion contains much amount of sediment. On the contrary, if the HLB of the polyoxyetliylene nonionic surfactant is too high, the viscosity of the emulsion increases. The term HLB used herein refers to numerical expression of a relative balance of hydrophilicity and lipophilicity for surfactant and described under "hydrophilic-lipophilic balance" in Rikagaku-Jiten (Dictionary of Physico-chemistry), 5th Ed.

Examples of the polyvinyl alcohol include normal partially hydrolyzed polyvinyl alcohol, completely hydrolyzed polyvinyl alcohol and modified type polyvinyl alcohols such as sulfonic acid-modified polyvinyl alcohol, carboxy-modified polyvinyl alcohol, silanol group-modified polyvinyl alcohol, acetacetylated polyvinyl alcohol and the like.

Examples of the polyoxyethylene nonionic surfactant include polyethylene oxide-polypropylene oxide block copolymer, polyethylene oxide-alkyl phenyl ether, polyethylene oxide-alkyl ether and the like.

According to the condition described under (3), it is required that the total amount of the polyvinyl alcohol used as above is 0.4–3 parts by weight per 100 parts by weight of vinyl acetate. 10–50%, preferably 20–40% of said total amount of the polyvinyl alcohol is placed in the copolymerization reaction system before the reaction and that the remaining 50–90%, preferably 60–80% of said total amount of the polyvinyl alcohol is supplied to the reaction system after the initiation of the copolymerization reaction. If the total amount of the polyvinyl alcohol is too little, the emulsion contains much amount of sediment. On the contrary, if said amount is too much, the viscosity of the emulsion increases. If the amount of initial charge of the polyvinyl alcohol is too little, the emulsion contains much amount of sediment. On the contrary, if said amount of initial charge is too much, then the viscosity of the emulsion increases.

According to the condition described under (4), it is required that the amount of said polyoxyethylene nonionic surfactant used is 1–5 parts by weight per 100 parts by weight of vinyl acetate, and the total amount of said polyoxyethylene nonionic surfactant is placed in the copolymerization reaction system before the reaction. If the total amount of the polyoxyethylene nonionic surfactant is too little, the emulsion contains much amount of sediment. On the contrary, if said amount is too much, the viscosity of the emulsion increases.

A preferred embodiment of the present invention is as follows. Into a reaction vessel for polymerization are charged water, vinyl acetate for initial charge, a polyvinyl alcohol for initial charge and the total amount of a polyoxyethylene nonionic surfactant. Then ethylene is supplied and the mixture is heated up to a polymerization temperature while stirring. The polymerization temperature is preferably 30–80° C. Then a polymerization catalyst is added. The polymerization catalyst may include redox type catalysts. Oxidizing agent includes hydrogen peroxide, t-butyl peroxide, sodium persulfate, potassium persulfate, ammonium persulfate and the like. Reducing agent includes sodium (or zinc) formaldehyde sulfoxylate, sodium glyoxal bisulfite, ferrous salts, sodiumtartrate and the like. When rise in temperature due to initiation of polymerization is observed, addition of vinyl acetate and the polyvinyl alcohol for subsequent addition is started.

The order of addition of vinyl acetate and the polyvinyl alcohol for subsequent addition is preferably simultaneous.

The polymerization reaction is preferably terminated when the residual amount of vinyl acetate in the reaction system is 1% by weight of the total amount of emulsion or less after completion of the addition of vinyl acetate and the polyvinyl alcohol for subsequent addition.

The aqueous emulsion obtainable according to the process of the present invention is an aqueous emulsion containing an ethylene-vinyl acetate copolymer having 10–40% by weight of ethylene unit and 90–60% of by weight of vinyl acetate unit and having a solid content of 70% by weight or more, a viscosity of 5,000 Pa.s or less. If the solid content is too low, the drying efficacy as adhesive is inferior. If the viscosity is too high, the spreadability as adhesive is inferior. The viscosity herein is measured according to JIS K6828 at a temperature of 25° C. using a Brookfield type viscosimeter.

The aqueous emulsion obtainable by the present invention is a stable emulsion in which rise in viscosity of the reaction system during copolymerization reaction is suppressed. Since the aqueous emulsion has an extremely high solid concentration and is excellent in drying efficiency, it is useful as an adhesive.

EXAMPLES

The present invention will now be specifically described by means of Examples, wherein "part by weight" is based on the total amount of vinyl acetate taken as 100 parts by weight.

Example 1

As an initial charge were used 75 parts by weight of vinyl acetate, 0.45 part by weight of a polyvinyl alcohol ("PVA 203" manufactured by Kuraray co., Ltd., degree of hydrolysis=88% by mole, average degree of polymerization=300) (corresponding to 33.3% of the total amount of polyvinyl alcohol to be used), 1.50 part by weight of polyoxyethylene nonionic surfactant ("Emulgen 931" manufactured by Kao Corp., HLB=17.2), 2.25 parts by weight of polyoxyethylene nonionic surfactant ("Pluronic L64" manufactured by Asahi Denka Kogyo K.K., HLB= 10.2) and 36 parts by weight of water.

Ethylene was supplied under stirring to initiate polymerization. The polymerization initiated at 25° C. and the temperature was elevated stepwise up to 60° C., which was kept until the polymerization was terminated. During the polymerization, conditions were kept by introducing ethylene at a temperature of 60° C. under a pressure of 45 kg/cm$^2$. A redox catalyst was used as the catalyst for polymerization. As the reducing agent, 0.25 part by weight of sodium formaldehyde sulfoxylate per the total amount of vinyl acetate was used. As the oxidizing agent, 0.12 parts by weight of hydrogen peroxide per the total amount of vinyl acetate was used. When the initial charge was placed, 45% of the reducing agent was added in one portion and the rest of the reducing agent and the oxidizing agent were added continuously during the polymerization.

After the initiation of the polymerization, 25 parts by weight of vinyl acetate and 0.90 part by weight of the polyvinyl alcohol (the same product as above) were continuously added as the subsequent addition. The subsequent addition was initiated after 2 hours from the initiation of the polymerization and terminated after 5 hours. The termination of the polymerization was the time when the residual amount of vinyl acetate was 1% or less. The obtained aqueous emulsion contained a copolymer having a weight ratio: ethylene/vinyl acetate of 22/78 and a glass transition temperature of −6° C., and had a solid content of 72.8% by weight and a viscosity of 610 mpa.s.

Example 2

The procedure in Example 1 was repeated except that the subsequent addition of vinyl acetate and polyvinyl alcohol was initiated after 1 hour from the initiation of the polymerization and terminated after 5 hours. The obtained aqueous emulsion contained a copolymer having a weight ratio: ethylene/vinyl acetate of 24/76 and a glass transition temperature of −9° C., and had a solid content of 74.0% by weight and a viscosity of 900 mpa.s.

Example 3

The procedure in Example 1 was repeated except that the subsequent addition of vinyl acetate and polyvinyl alcohol was initiated after 3 hours from the initiation of the polymerization and terminated after 5 hours. The obtained aqueous emulsion contained a copolymer having a weight ratio: ethylene/vinyl acetate of 23/77 and a glass transition temperature of −8° C., and had a solid content of 73.5% by weight and a viscosity of 530 mpa.s.

Comparative Example 1

The procedure in Example 1 was repeated except that the total amount of the polyvinyl alcohol was used as the initial charge and the subsequent addition of vinyl acetate was carried out from 3 hours of the initiation of the polymerization to 5 hours. The obtained aqueous emulsion contained a copolymer having a weight ratio: ethylene/vinyl acetate of 23/77 and a glass transition temperature of 8° C., and had a solid content of 72.4% by weight and a viscosity of 14,000 mpa.s.

Comparative Example 2

The procedure in Example 1 was repeated except that 1.34 part by weight of the polyvinyl alcohol used in Example 1 and 0.34 part by weight of a polyvinyl alcohol ("PVA 217" manufactured by Kuraray Co., Ltd., degree of hydrolysis= 88%) having an average degree of polymerization=1,700 were placed as the initial charge and the subsequent addition of polyvinyl alcohol was omitted. The obtained aqueous emulsion contained a copolymer having a weight ratio: ethylene/vinyl acetate of 21/79 and a glass transition temperature of −4° C., and had a solid content of 71.1% by weight and a viscosity of 17,250 mpa.s.

What is claimed is:

1. A process for producing an aqueous emulsion having a solid content of 70% by weight or more, a viscosity of 5,000 mPa.s or less and containing an ethylene-vinyl acetate copolymer having 10–40% by weight of ethylene units and 90–60% of by weight of vinyl acetate units, wherein said process comprises:
   (1) mixing in a copolymerization reaction:
      i) 50–90% of the total amount of vinyl acetate used in the process;
      ii) an emulsifying dispersant comprising a polyvinyl alcohol and a polyoxyethylene nonionic surfactant; wherein said dispersant is present in 2–6 parts by weight per 100 parts by weight of said vinyl acetate, said polyvinyl alcohol has a degree of hydrolysis of 80% or more by mole and an average degree of polymerization of 200 to 1000, said polyoxyethylene nonionic surfactant has a hydrophilic-lipophilic balance of 10 to 20,
   and wherein said polyvinyl alcohol in the dispersant comprises 10 to 50% of the total amount of polyvinyl alcohol used in the process;
   2) initiating the copolymerization reaction;
   3) adding the remaining 50% to 10% of said vinyl acetate used in the process and the remaining 50% to 90% of the polyvinyl alcohol;
   wherein the total amount of said emulsifying dispersant is 2 to 6 parts by weight per 100 parts by weight of vinyl acetate and the total amount of said polyvinyl alcohol is 0.4 to 3 parts by weight per 100 parts by weight of said vinyl acetate and the amount of said polyoxyethylene nonionic surfactant is 1 to 5 parts by weight per 100 parts by weight of said vinyl acetate;
   to obtain an aqueous emulsion having a solid content of 70% by weight or more, a viscosity of 5,000 mPa.s or less and containing an ethylene-vinyl acetate copolymer having 10–40% by weight of ethylene units and 90–60% of by weight of vinyl acetate units.

2. A process according to claim 1, wherein the polyvinyl alcohol has an average degree of polymerization of 250–800.

3. A process according to claim 1, wherein 20–40% of polyvinyl alcohol is placed in the copolymerization reaction system before the reaction and the remaining 60–80% is supplied to the reaction system after the initiation of the copolymerization reaction.

* * * * *